Jan. 4, 1938.  H. L. BONE  2,104,606
RAILWAY BRAKING APPARATUS
Filed June 1, 1936  6 Sheets-Sheet 1

INVENTOR
Herbert L. Bone.
BY
HIS ATTORNEY

Jan. 4, 1938.   H. L. BONE   2,104,606
RAILWAY BRAKING APPARATUS
Filed June 1, 1936   6 Sheets-Sheet 2

INVENTOR
Herbert L. Bone.
BY
HIS ATTORNEY

Jan. 4, 1938.   H. L. BONE   2,104,606
RAILWAY BRAKING APPARATUS
Filed June 1, 1936   6 Sheets-Sheet 3

INVENTOR
Herbert L. Bone.
BY
HIS ATTORNEY

Jan. 4, 1938. H. L. BONE 2,104,606
RAILWAY BRAKING APPARATUS
Filed June 1, 1936 6 Sheets-Sheet 5

INVENTOR
Herbert L. Bone.
BY
HIS ATTORNEY

Jan. 4, 1938.  H. L. BONE  2,104,606
RAILWAY BRAKING APPARATUS
Filed June 1, 1936    6 Sheets-Sheet 6

INVENTOR
Herbert L. Bone.
BY
HIS ATTORNEY

Patented Jan. 4, 1938

2,104,606

UNITED STATES PATENT OFFICE 2,104,606

RAILWAY BRAKING APPARATUS

Herbert L. Bone, Pittsburgh, Pa., assignor to The Union Switch & Signal Company, Swissvale, Pa., a corporation of Pennsylvania Application June 1, 1936, Serial No. 82,771

25 Claims. (Cl. 188—62)

My invention relates to railway braking apparatus, and particularly to that class of braking apparatus known as car retarders. More particularly, my invention relates to inert car retarders, that is to say, to car retarders in which the braking bars are normally constantly biased to braking positions in which they exert a fixed amount of retardation on all cars which pass through the retarder.

One object of my invention is to provide a car retarder of the type described which can be readily adjusted manually when, due to wear or to changes in the weather or traffic conditions, it is desirable to change the amount of retardation.

Another object of my invention is to provide a car retarder of the type described which is inexpensive to manufacture and install, and which at the same time is highly efficient in operation.

A further object of my invention is to provide a car retarder of the type described which may be attached directly to, and supported entirely by, the rail or rails with which it is associated.

Other objects of my invention will appear as the description proceeds.

I will describe several forms of car retarders embodying my invention, and will then point out the novel features thereof in claims.

In the accompanying drawings.

Similar reference characters refer to similar parts in each of the several views.

Figure 1:
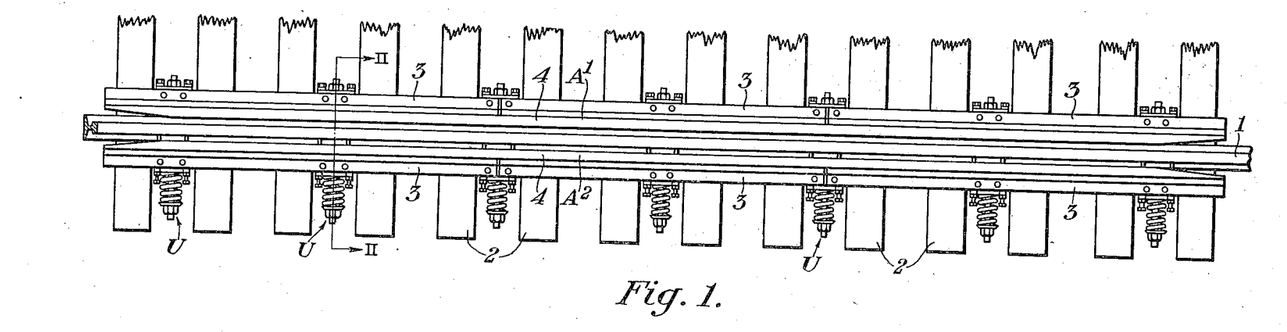
Fig. 1 is a top plan view showing one form of car retarder embodying my invention.

Referring first to Fig. 1, the reference character 1 designates one track rail of a stretch of railway track, which track rail is mounted on crossties 2 in the usual and well-known manner. Extending parallel to rail 1 on opposite sides of the rail are two braking bars $A^1$ and $A^2$, each comprising a plurality of aligned brake beams 3 and a brake shoe 4. The brake beams 3 and brake shoes 4 are preferably made alike in cross section to decrease the cost of manufacture, and in the form shown in Fig. 2 both the brake beams and the brake shoe have L-shaped cross sections. It should be noted, however, that my invention is not limited to the particular shape of the beams and shoes shown in Fig. 2.

The braking bars $A^1$ and $A^2$ are supported by a plurality of spring units U which are disposed at intervals along the rail 1, and which serve to constantly bias the braking bars toward the rail to braking positions in which the brake shoes 4 frictionally engage the opposite side faces of each car wheel passing through the retarder. These spring units are all alike, and a description of one will therefore suffice for all.

Figure 2:
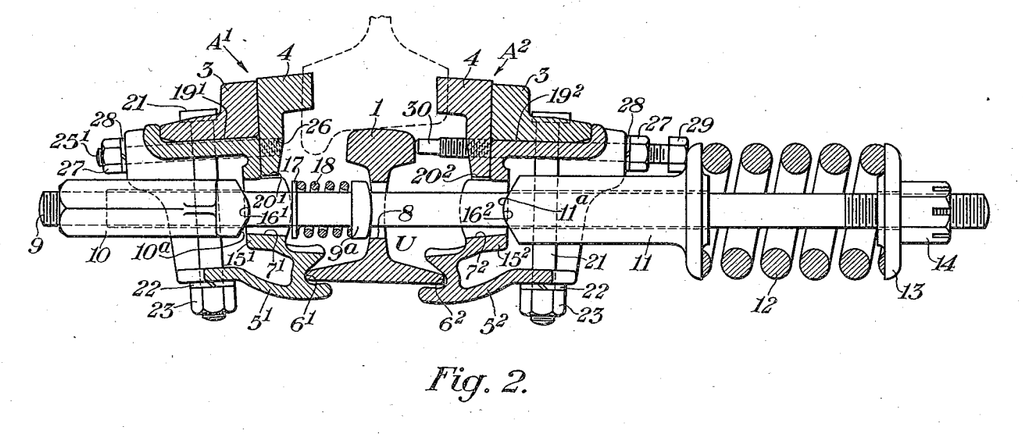
Fig. 2 is an enlarged vertical sectional view taken substantially on the line II—II of Fig. 1, and showing the details of construction of one of the combined supporting and spring units for the car retarder shown in Fig. 1.
Figure 3:
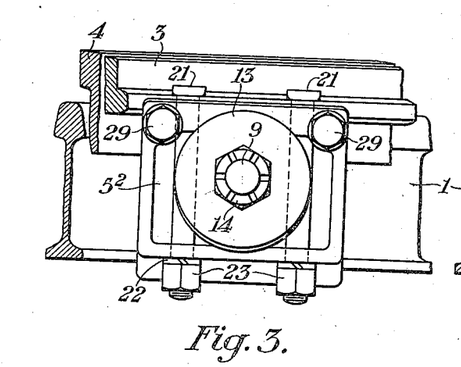
Figs. 3 and 4 are right-hand and left-hand views, respectively, of the spring unit U shown in Fig. 2.
Figure 4:
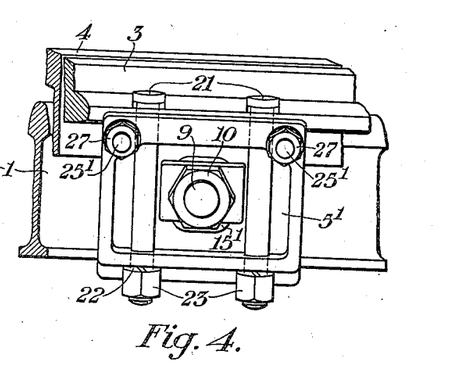
Figure 6:
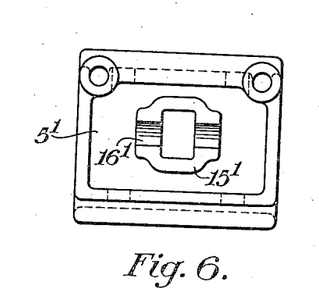
Figure 7:
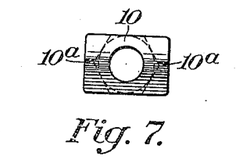
Fig. 7 is a right-hand end view of the nut 10 shown in Fig. 2.
Figure 8:
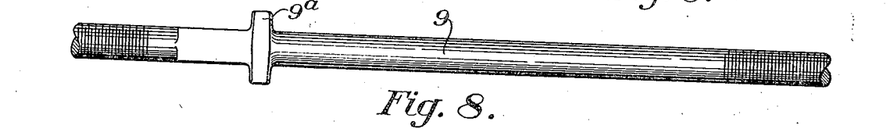
Fig. 8 is a detail view of the spring bolt 9 forming part of the unit U shown in Fig. 2.

Referring particularly to the spring unit U shown in Figs. 2, 3, and 4, this unit comprises two similar cast levers $5^1$ and $5^2$ provided at their lower end with channel-shaped recesses $6^1$ and $6^2$ which loosely receive the opposite base flanges of the rail 1 in such manner that the levers are free to pivot about the base flanges as a fulcrum. The levers are also provided with tapered rectangularly shaped openings $7^1$ and $7^2$ which align with an opening 8 provided in the web of the rail 1, and extending with some clearance through the openings $7^1$ and $7^2$ and 8 is a spring bolt 9 (see Fig. 8), the left-hand end of which, as viewed in Fig. 2, is provided with a gauge adjusting nut 10, and the right-hand end of which is provided with an inner spring seat 11, a compressed coil spring 12, an outer spring seat 13, and a spring tension adjusting nut 14. The gauge adjusting nut 10 bears at its inner end against a boss 15¹ which is formed on the lever 5¹ adjacent the outer end of the opening 7¹, and to facilitate rotation of the lever 5¹ relative to the spring bolt 9 the inner end of the nut 10 is provided, on opposite sides of the bolt 9, with horizontally aligned rounded bulges 10ª (see Fig. 7) and the boss 15¹ is provided on opposite sides of the opening 7¹ with horizontally aligned rounded grooves 16¹ (see Fig. 6) which grooves receive the bulges 10ª. The spring seat 11 likewise bears at its inner end against a boss 15² which is formed on the lever 5² adjacent the outer end of the opening 7², and to facilitate rotation of the lever 5² relative to the spring seat, the inner end of the spring seat is provided on opposite sides of the bolt 9 with horizontally aligned rounded bulges 11ª similar to the bulges 10ª on the nut 10, and the boss 15² is provided on opposite sides of the opening 7² with horizontally aligned rounded grooves 16² similar to the groove 16¹ on the lever 5¹, which grooves receive the bulges 11ª. The bulges 10ª and grooves 16¹ also serve to lock the nut 10 in adjusted positions, while the bulges 11ª and grooves 16² serve to prevent the inner spring seat 11 from turning.

Figure 5:
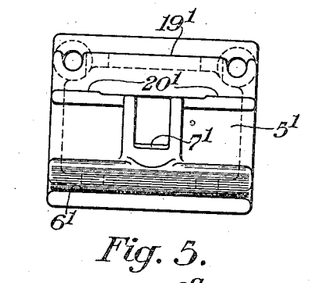
Figs. 5 and 6 are views of the lever $5^1$ of the unit U shown in Figs. 2, 3, and 4 as it appears when viewed from the right and left, respectively, in Fig. 2.

The lever 5¹ is further provided with an L-shaped upper surface 19¹ which supports the adjacent brake beam 3 of the braking bar A¹, and with two laterally spaced horizontally aligned shoulders 20¹ (see Fig. 5) which partly support the brake shoe 4 of the braking bar A¹. The lever 5² is likewise provided with an L-shaped upper surface 19² which supports the adjacent brake beam 3 of the braking bar A², and with two laterally spaced horizontally aligned shoulders 20² which are similar to the shoulders 20¹ on the lever 5¹, and which partly support the brake shoe 4 of the braking bar A². The brake beam 3 of the braking bar A¹ is secured to the lever 5¹ by means of two vertical bolts 21 which extend downwardly through clearance holes in the brake beam and in the lever on opposite sides of the nut 10, and which are provided at their lower ends with lock washers 22 and nuts 23, and the brake beam 3 of the braking bar A² is similarly secured to the lever 5². The brake shoe 4 of braking bar A¹ is secured to the lever 5¹ by means of a pair of horizontally disposed studs 25¹ which extend inwardly through clearance holes in the lever and are screwed into tapped holes 26 formed in the brake shoe, in such manner that the inner ends of the studs are substantially flush with the inner surface of the lower portion of the brake shoe. The outer ends of the studs 25¹ are provided with nuts 27 and lock washers 28. The brake shoe 4 of the braking bar A² is secured to the lever 5² by means of a pair of stud bolts 29 in substantially the same manner that the shoe 4 of the braking bar A¹ is secured to the lever 5¹, but the inner ends of the stud bolts 29 extend through the shoe 4 and are provided with unthreaded stop portions 30 which cooperate with the head of the rail 1 to position the braking bar A² when no car is passing through the retarder. The stud bolts 29 are so adjusted that when their inner ends are engaging the rail head, the braking bar A² will occupy its normal position in which it is shown in the drawings, it being obvious that before an adjustment can be made, it is necessary to loosen the nuts 27 on bolts 29, and that after the adjustment has been completed, it is necessary to again tighten the nuts 27.

Formed integrally with the bolt 9 on the left-hand side of the rail 1 is a shoulder 9ª, and surrounding the bolt between this shoulder and a washer 17 which bears against the lever 5¹ adjacent the inner end of the opening 7¹ is a compressed coil spring 18 which serves to maintain the lever 5¹ and the bolt 9 in the relative positions in which the bulges 10ª on the gauge adjusting nut 10 are in engagement with the grooves 16¹ in the boss 15¹. The gauge adjusting nut 10 is so adjusted that when the shoulder 9ª is engaging the web of the rail 1, the braking bar A¹ will occupy its normal position in which it is shown in the drawings.

As best seen in Fig. 1, the brake shoes 4 are flared outwardly at each end of the retarder in accordance with well-known practice to provide a smooth entrance of the car wheels between the brake shoes when a car passes through the retarder.

The operation of the retarder as a whole is as follows: When no car is passing through the retarder, the compressed spring 12 of each spring unit U moves the associated bolt 9 to the right to the position in which the shoulder 9ª on the bolt engages the rail web, and rotates the associated lever 5² in a counter-clockwise direction to the position in which the inner ends 30 of the associated bolts 29 engage the rail head, thereby causing the braking bar A² to occupy its normal position, while the spring 18 of each unit U holds the associated lever 5¹ in the position in which the curved recess 16¹ in the boss 15¹ of such lever engages the bulges 10ª on the associated adjusting nut 10, thus causing the braking bar A¹ to occupy its normal position. It should be pointed out that when the braking bars occupy their normal positions, the initial compression which is set in the spring 12 of each spring unit U by the associated spring tension adjusting nut 14 is then held between the shoulder 9ª on the bolt 9 and the inner ends 30 of the bolts 29, so that the braking bars are firmly held in their normal positions. It should also be pointed out that when the braking bars occupy their normal positions, the brake shoes 4 of the two braking bars are closer together than the width of a car wheel, and each projects into the path which a wheel takes in traversing the rail 1, as will be apparent from an inspection of Fig. 2 in which the position which a wheel occupies when it is traversing rail 1 is indicated by the wheel shown in dotted lines in this figure. When a car enters the retarder, the wheels of the car will force the brake shoes apart against the bias of the springs 12 of the spring units, thus causing the levers 5¹ of the spring units to successively rotate in a counter-clockwise direction about the rail flange, and the levers 5² of the units U to successively rotate in a clockwise direction about the rail flange. The counter-clockwise rotation of each lever 5¹ moves the adjacent nut 10 and bolt 9 toward the left, and also causes a slight rotating motion to take place between the associated adjusting nut 10 and the curved recess 16¹ in the lever, while the clockwise rotation of each lever 5² moves the associated spring seat 11 toward the right to a position in which the associated spring 12 becomes compressed beyond its initial compression, and also causes a rotating motion between the associated inner spring seat 11 and the curved recess 16² of the associated lever 5². The braking forces which are exerted on the car will, of course, depend upon the stiffness of the springs 12 of the spring units and the amount of initial compression of the springs, and may be adjusted by adjusting the normal positions of the braking bars and the initial compression of the springs 12. The brake beams and brake shoes are so constructed that they are somewhat flexible and it will be apparent, therefore, that the apparatus will exert the full retarding force which it is capable of exerting on each car wheel as it passes through the retarder.

If it is desired to render the retarder inactive for any reason, this may be done by backing off the gauge adjusting nut 10 of each unit a few turns. This will cause the inside braking bar $A^1$ to move away from the rail to a position in which it is clear of the car wheels of cars passing through the apparatus, but will not cause the outside braking bar $A^2$ to move. However, since the retarder is of the single rail type, the car wheel which is being engaged by the braking bar $A^2$ can move away from the brake shoe 4 of this braking bar, the adjustment of the braking bar $A^1$ being such that a sufficient amount of motion of the car wheel is permitted to render the frictional contact between the outside braking bar and the car wheel substantially negligible.

It should be pointed out that when the brake shoes become worn, this wear can be compensated for by adjusting the gauge adjusting nut 10 and the stud bolts 29 in a manner to permit the wheel engaging surfaces of the brake shoes 4 to move closer to the rails. The method of making this adjustment will be obvious from the foregoing description and from an inspection of the drawings without further detailed description.

Figure 9:
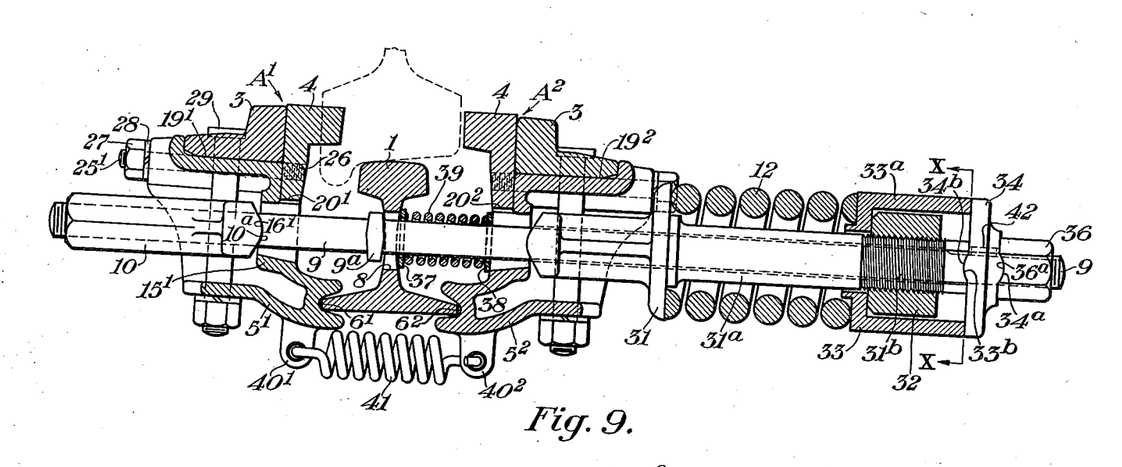
Fig. 9 is a view similar to Fig. 2 showing a modified form of the car retarder illustrated in Figs. 1 and 2.
Figure 10:
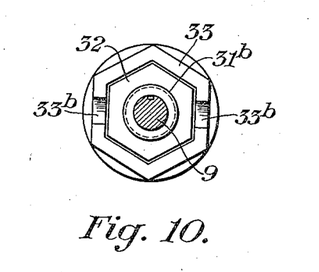
Fig. 10 is a sectional view taken on the line X—X of Fig. 9.
Figure 11:
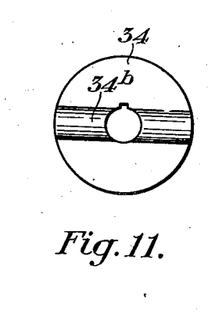
Figs. 11 and 12 are left-hand and right-hand side views, respectively, of the lock washer 34 shown in Fig. 9.
Figure 12:
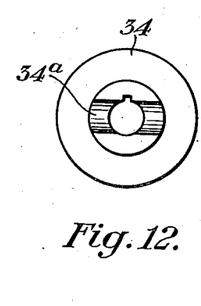

A car retarder constructed in the manner thus far described is intended for use primarily as a single rail retarder. When it is desired to provide both rails with a retarder, each spring unit U will preferably be modified in the manner shown in Figs. 9 and 10, whereby both braking bars may be moved to inactive positions in which they are out of engagement with car wheels when it is desired to render the retarder inactive. Referring to Figs. 9 and 10, as here shown, the right-hand end of the spring bolt 9 is provided with an inner spring seat 31 which is similar in all respects to the inner spring seat 11 shown in Fig. 2 with the exception that this latter spring seat is formed with an integral tubular extension $31^a$ which surrounds the bolt 9 with some clearance, and which is provided at its right-hand end with a screw-threaded portion $31^b$ for the reception of a hexagonal spring adjusting nut 32. The spring 12 surrounds the tubular extension $31^a$ and bears at its right-hand end against an outer spring seat 33 which is slidably mounted on the tubular extension $31^a$ on the left-hand side of the nut 32. The outer spring seat is made hexagonal in shape to permit it to be readily rotated for a purpose which will appear presently, and is provided with a hexagonal extension $33^a$ which encloses the adjusting nut 32 in such manner that this nut is free to slide longitudinally within the extension, but that, rotation of the spring seat will cause corresponding rotation of the adjusting nut. The right-hand end of the hexagonal extension of the outer spring seat abuts against a lock washer 34, and the lock washer 34, in turn, abuts against an outside gauge adjusting nut 36 that is screwed onto the outer end of the spring bolt 9. The inner face of the lock washer 34 is formed with aligned bulges $34^b$ (see Fig. 11) which are held, by the compression of the spring 12, in engagement with aligned recesses $33^b$ (see Fig. 10) formed in two opposite sides of the outer end of the extension $33^a$ of spring seat 33, and the outer face of the lock washer 34 is similarly provided with aligned bulges $34^a$ which are held, by the compression of the spring 12, in engagement with aligned recesses $36^a$ formed in the inner face of the nut 36, whereby the outer spring seat 33, the lock washer 34, and the nut 36 are all automatically locked against relative rotation. Lock washer 34 is free to slide endwise on the spring bolt 9, but is keyed to the spring bolt by means of a feather key 42 in order to prevent rotation of the lock washer relative to the spring bolt. Spring bolt 9 is prevented from rotating by engagement of the shoulder $9^a$ with either the head or the base of the rail.

The retarder in the form shown in Fig. 9 also comprises a compressed coil spring 39 which is mounted on the spring bolt 9 on the right-hand side of the rail 1 between a washer 37 which abuts against the web of the rail, and a washer 38 which abuts against the lever $5^2$, and which serves to constantly bias the spring bolt assembly as a whole toward the right to the position in which the shoulder $9^a$ of the spring bolt 9 engages the web of the rail, as well as a coil spring 41 which is stretched between two depending lugs $40^1$ and $40^2$ formed on the levers $5^1$ and $5^2$, respectively, and which serves to maintain the levers $5^1$ and $5^2$ in proper engagement with the rails at the recesses $6^1$ and $6^2$ and the lever $5^1$ in engagement with the inside gauge adjusting nut 10. The remainder of the retarder as shown in Fig. 9 is similar in all respects to that shown in Figs. 1 and 2, with the exception that the spring 18 shown in Figs. 1 and 2 has been omitted because this spring is not necessary.

With the spring units U constructed in the manner shown in Fig. 9, it will be apparent that the spring 12 of each unit constantly biases the inner and outer spring seats to the relative positions in which the nut 32 engages the right-hand side of the spring seat 33, and that the initial compression of the spring 12 of each unit, therefore, depends upon the adjustment of the nut 32. This adjustment may be varied by turning the outer spring seat 33 by means of a wrench or other suitable tool, it being noted that due to the fact that the lock washer 34 is keyed to the spring bolt 9, the rotation of the spring seat will not cause rotation of the outside gauge adjusting nut 36. It will also be apparent that when no car wheels are engaging the braking bars $A^1$ and $A^2$ in the vicinity of a spring unit, the spring bolt assembly of such unit will move as a whole toward the right due to the bias of the associated spring 39 to the position in which the shoulder $9^a$ of the spring bolt engages the rail web, and that when the spring bolt assembly of a spring unit occupies this position, the inside braking bar $A^1$ at the point where it is attached to the unit will occupy a position relative to the rail 1 which depends upon the adjustment of the inside adjusting nut 10, while the outside braking bar $A^2$ at the point where it is attached to the unit will occupy a position relative to the rail which depends upon the adjustment of the outside gauge adjusting nut 36. The nut 10 of each unit is so adjusted that when the shoulder $9^a$ of the bolt 9 is engaging the rail web, the braking bar $A^1$ will occupy its proper normal position, and the nut 36 is so adjusted that when the shoulder $9^a$ is engaging the rail web and the nut 32 is engaging the spring seat 33, the braking bar $A^2$ will occupy its proper normal position. It should be noted that each of the two gauge adjustments of each unit is independent of the other adjustment, and that a change in either adjustment will, therefore, have no effect on the other adjustment. It should also be noted that since the washers 34 of the spring units are prevented from turning by the key 42, adjustment of the outside adjusting nuts 36 will not affect the adjustment of the initial compression of the springs 12. It should further be noted that when the two braking bars occupy their normal positions in which positions they are shown in the drawing, the distance between the two braking bars will be less than the width of a car wheel, but the two braking bars will be so positioned that the inside braking bar will project into the path of a car wheel traversing rail 1, while the braking bar A² will be disposed outside of the path of a car wheel traversing rail 1.

The operation of the retarder as a whole when the spring units are constructed in the manner shown in Fig. 9 is as follows: When no car is passing through the retarder, the braking bars are held in their normal positions by the spring units, the two levers of each spring unit under these conditions being biased toward each other by a force which depends upon the initial compression of the springs 12 of the spring units, as will be readily apparent from an inspection of the unit U shown in Fig. 9. When a car enters the retarder, the forward wheel of the car will engage the inside braking bar A¹ and will move it toward the left, thus causing the inside lever 5¹ of the unit nearest the wheel to rotate in a counter-clockwise direction. This rotation of the lever 5¹ will act through the nut 10, spring bolt 9, nut 36, washer 34, outer spring seat 33, spring 12, and inner spring seat 31 to cause the lever 5² of this unit to rotate in the same direction that the lever 5¹ was rotated, and will thus cause the outside braking bar A² to move into engagement with the outside surface of the car wheel. As soon as the outside braking bar has moved into engagement with the car wheel, the further separation of the levers of the adjacent spring unit by the car wheel will cause the spring 12 of such unit to become compressed beyond its initial compression, whereupon the nut 32 of the unit will move away from the outer spring seat 33, and will thus cause the two braking bars to be held into frictional engagement with the forward wheel of the car by a force which depends upon the characteristics and adjustment of the spring 12. The braking bars are flexible, and as the wheels of the car move through the apparatus, the spring units will operate in succession to cause the braking bars to exert a braking force on the wheels. It will be obvious that with the spring units constructed as shown in Fig. 9 it is desirable to flare the inside brake shoes at the entering and leaving ends of the retarders to a greater extent than when the retarder units are constructed in the manner shown in Fig. 2.

One advantage of a retarder constructed in the manner just described is that since the braking bar A² is normally out of the path of the car wheels traversing rail 1, the retarder can be rendered wholly inactive by backing off the adjusting nuts 10 to such positions that the inside braking bar A¹ is also out of the path of the car wheels. This feature is particularly desirable when the retarder is used as a double rail retarder for reasons which will be readily apparent.

Another advantage of the retarder constructed in the manner just described is that it is not necessary to make a centering adjustment when the outside brake shoes are adjusted to compensate for brake shoe wear.

A further advantage of the retarder shown in Fig. 9 is that the recoil of the springs 12 of the spring units is all taken up in the associated spring bolt assembly.

It should be particularly pointed out that while, with the spring units constructed in the manner shown in Fig. 9, it is preferable to adjust the two adjusting nuts 10 and 36 in the manner previously described, these nuts can, if desired, be so adjusted that the brake shoes when in their normal positions, are in the same relation to car wheels as the brake shoes of the retarder shown in Fig. 2, in which event the operation of the retarder will be essentially the same as the operation of the retarder shown in Fig. 2. When the retarder is adjusted in this manner, however, it is necessary in order to render the retarder inactive, to back off both adjusting nuts.

Figure 13:
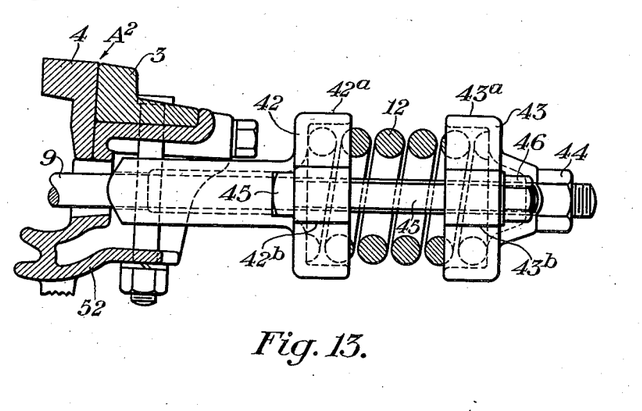
Fig. 13 is a side view showing a modified form of spring bolt assembly which may be used in place of the spring bolt assembly shown in Fig. 9.
Figure 14:
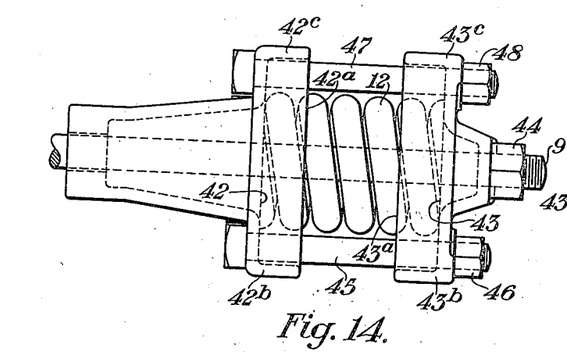
Fig. 14 is a top plan view of the spring bolt assembly shown in Fig. 13.
Figure 15:
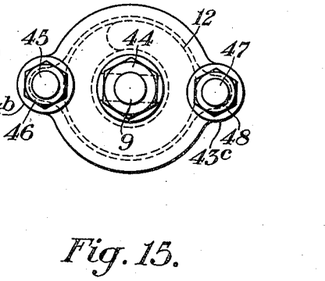
Fig. 15 is a right-hand end view of Fig. 13.

Referring now to Figs. 13, 14, and 15, I have here shown a modified form of spring bolt assembly which may be used in place of that shown in Fig. 9. As here illustrated, the coil spring 12 is disposed between an inside spring seat 42 and an outside spring seat 43, which spring seats are slidably mounted on the spring bolt 9 between the lever 5² and an outside gauge adjusting nut 44. The inside spring seat 42 cooperates at its left-hand end with the lever 5² in the same manner that the spring seats 11 and 31 shown in Figs. 2 and 9, respectively, cooperate with this lever, and this spring seat is provided with a laterally projecting skirt portion 42ª which cooperates with the spring 12 to hold it in a centered position, and with two diametrically opposite apertured lugs 42ᵇ and 42ᶜ. The outer spring seat 43 is likewise provided with a laterally projecting skirt portion which cooperates with the spring 12 to hold it in a centered position, and with two diametrically opposite apertured lugs 43ᵇ and 43ᶜ which align with the lugs 42ᵇ and 42ᶜ of the spring seat 42. A bolt 45 extends with some clearance through the apertures in the aligned lugs 42ᵇ and 43ᵇ and is provided adjacent the outer side of the lug 43ᵇ with a nut 46, and a bolt 47 similarly extends through the apertures in the aligned lugs 42ᶜ and 43ᶜ and is provided adjacent the outer side of the lug 43ᶜ with a nut 48.

It will be apparent that with the spring bolt assembly constructed in the manner just described, the initial compression of the spring 12 may be adjusted by adjusting the nuts 46 and 48, and the non-braking position of the braking bar A² may be adjusted by adjusting the nut 44. The operation of the retarder as a whole when the spring units are provided with the spring bolt assembly shown in Figs. 13, 14, and 15 is similar to that when the spring units are provided with the spring bolt assembly shown in Fig. 9, and need not, therefore, be repeated.

Figure 16:
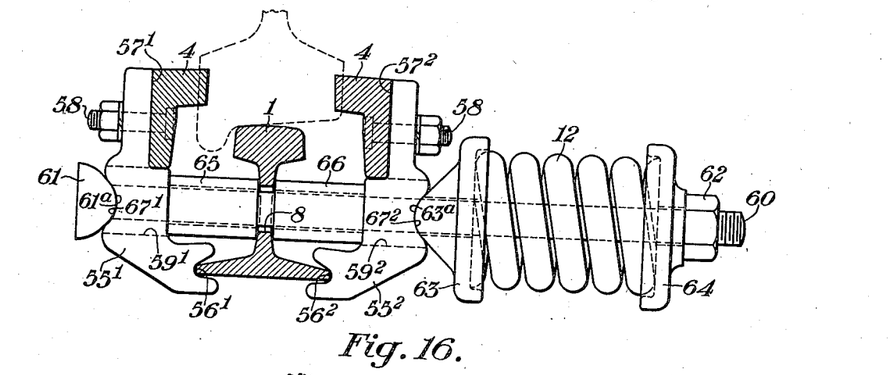
Figs. 16, 17, 18, and 19 are views similar to Fig. 2 showing other forms of car retarders embodying my invention.

Referring now to Fig. 16, the car retarder in the form here shown comprises a spring unit consisting of two similar levers 55¹ and 55² which are pivotally supported at their lower ends on the rail flanges on opposite sides of the rail 1 by means of recesses 56¹ and 56² in the same manner that the levers 5¹ and 5² shown in the preceding views are supported on the rail flanges on opposite sides of the rail 1 by means of recesses 6¹ and 6², and which are provided at their upper ends with L-shaped recesses 57¹ and 57² for the reception of brake shoes 4 which are bolted to the levers by means of bolts 58. The levers 55¹ and 55² are also provided with aligned openings 59¹ and 59², and extending with considerable clearance through these openings and through an opening 8 in the rail 1 is a spring bolt 60, one end of which is provided with a head 61, and the other end of which is threaded for the reception of a nut 62. Mounted on the spring bolt 60 between the nut 62 and the lever 55² are an inner spring seat 63 and an outer spring seat 64, and surrounding the bolt between the two spring seats 63 and 64 is a compressed coil spring 12 which constantly biases the levers toward each other by a force which depends upon the stiffness of the spring 12 and the adjustment of the nut 62. Also mounted on the spring bolt 60 are two spacing sleeves 65 and 66, one of which is disposed between the rail 1 and the inside lever 55¹, and the other of which is disposed between the rail 1 and the outside lever 55², and which are of such lengths that when these sleeves are engaging both the rail and the associated levers the inside and outside brake shoes will occupy their normal positions. To facilitate rotation of the lever 55¹ relative to the spring bolt, the head 61 is provided on opposite sides of the bolt with aligned rounded bulges 61ª which cooperate with mating recesses 67¹ formed in the outer side of the lever 55¹, and to facilitate rotation of the lever 55² relative to the inner spring seat 53 the inner face of this spring seat is provided on opposite sides of the spring bolt with rounded bulges 63ª which cooperate with mating recesses 67² formed in the outer side of the lever 55².

It will be understood that while in Fig. 16 I have only shown one spring unit of the retarder, in actual practice the retarder will comprise a plurality of such units, in the same manner that the retarder shown in Fig. 1 comprises a plurality of spring units. It will also be understood that the brake shoes 4 of the retarder when the retarder is constructed in the manner shown in Fig. 16 will be continuous throughout the retarder, and will perform the same functions that the brake shoes and brake beams together perform in the previously described forms of retarders.

The operation of the retarder as a whole when constructed in the manner shown in Fig. 16 will be readily understood from an inspection of the drawings and from the preceding description without further detailed description. It should be pointed out, however, that with the form of spring unit U shown in Fig. 16 when it is desired to compensate for brake shoe wear, it is necessary to replace the spacing sleeves 65 and 66 with other sleeves which are shorter than any ones shown.

Figure 17:
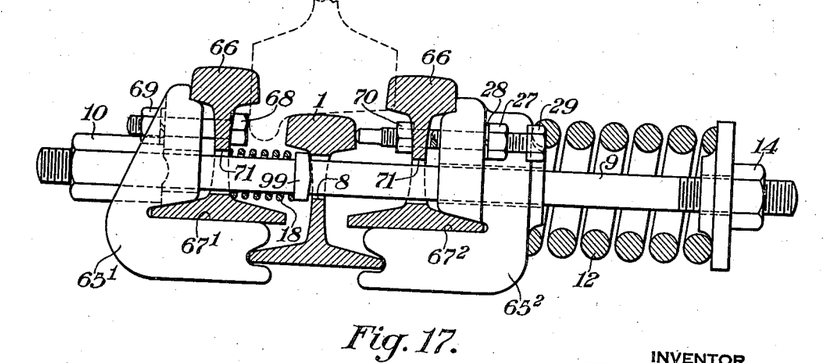

Referring now to Fig. 17, the car retarder in the form here shown is similar to that shown in Figs. 1 and 2, with the exception that the two levers of the spring unit, which levers have been designated 65¹ and 65², respectively, have been designed to permit the use of standard track rail sections 66 to perform the functions which are performed by the brake shoe and brake beam combination shown in Fig. 2, and the lever 65² has further been designed to permit the inner end of the spring 12 to bear directly against the outer face of this lever, thus eliminating the necessity for the inner spring seat 11 shown in Fig. 1. The inside rail section 66 rests at its lower end on a horizontal supporting surface 67¹ formed on the lever 65¹, and is bolted to the lever by means of bolts 68 provided with nuts 69, while the outside rail section 66 likewise rests at its lower end on a horizontal supporting surface 67² provided on the lever 65² and is bolted to this latter lever by means of stud bolts 29 which pass through clearance holes in the web of the outside rail section, and are provided at their inner ends with nuts 70. The stud bolts 29 serve to position the outside rail section 66 in the desired non-braking position when no car is passing through the retarder in the same manner that these bolts serve to position the outside braking bar in Fig. 2. Since the webs of the rail sections 66 extend below the stud bolt 9, these webs are provided with clearance holes 71 through which the spring bolt passes. The normal position of the inside rail section 66 is obtained by means of the adjusting nut 10 in the same manner as in Fig. 1. The operation of the retarder as a whole when the units are constructed as shown in Fig. 17 will be obvious from the foregoing description, and from an inspection of the drawings without further detailed description.

Figure 18:
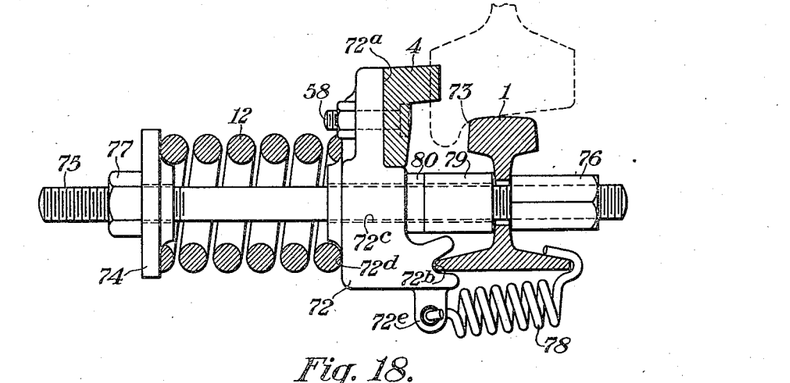

Referring now to Fig. 18, the retarder here shown is of the single rail single brake shoe type in which the retardation is obtained by engagement of the inside brake shoe with the inside faces of the car wheels, and by the consequent equal pressure of the wheel flanges against the head of the rail at the point 73. The retarder comprises a brake shoe 4 bolted by means of bolts 58 within an L-shaped recess 72ª formed in the inner face of a lever 72, the lower end of which is pivoted on the rail flange on the inside of the rail by means of a horizontally disposed recess 72ᵇ which is formed in the lever, and which receives the rail flange. The lever 72 is provided with a through opening 72ᶜ which aligns with an opening 8 in the rail, and extending through the opening 72ᶜ in the lever 72 and the opening 8 in the rail with some clearance is a spring bolt 75, the right-hand end of which is threaded to receive a nut 76, and the left-hand end of which is threaded to receive a nut 77. The left-hand face of the lever 72 is formed with an integral spring seat 72ᵈ, and surrounding the right-hand end of the spring bolt between this spring seat and an outside spring seat 74 which abuts against the nut 77 is a compressed coil spring 12 which, when the nut 76 is properly adjusted, biases the lever 72 to a position in which the brake shoe 4 will engage the inside face of each car wheel traversing rail 1. The lever 72 is held in engagement with the rail at its lower end by means of a tension spring 78, one end of which is hooked over the rail flange on the side of the rail opposite to the lever 72, and the other end of which is hooked through a hole in a depending lug 72ᵉ which is provided on the lower end of the lever 72. The desired normal position of the brake shoe 4 is obtained by means of a spacing sleeve 79 and a spacing washer 80, the thickness of which washer may be varied to compensate for brake shoe wear. The operation as a whole of the retarder shown in Fig. 18 will be readily understood from an inspection of the drawings without further description. It should be noted, however, that whenever it is desired to render the retarder ineffective to retard cars, this may be readily done by backing off the nut 76 to such a position that the spring 78 will hold the brake shoe 4 out of engagement with the wheels of any car which may pass through the retarder.

Figure 19:
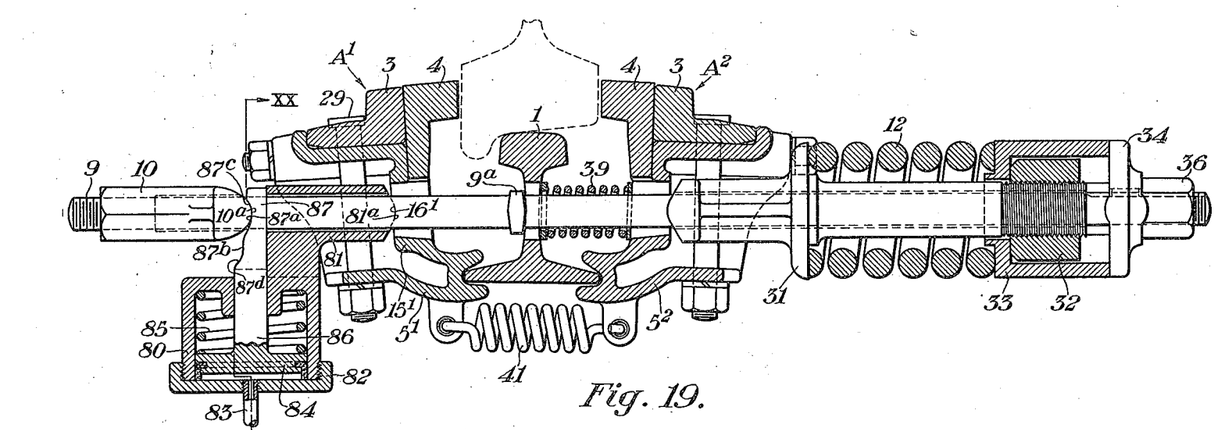
Figure 20:
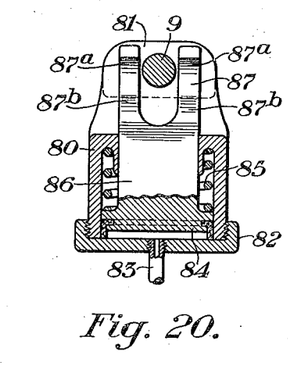
Fig. 20 is a sectional view taken substantially on the line XX—XX of Fig. 19.

Referring now to Figs. 19 and 20, the car retarder in the form here shown comprises a spring unit U similar to that shown in Fig. 9 provided with power means, whereby the braking bars may be automatically operated between their normal and inactive positions. The power means for operating the braking bars between their normal and inactive positions as here illustrated comprise a fluid pressure cylinder 80 formed integral with a combined support and cam guide 81 which is mounted on the spring bolt 9 between the gauge adjusting nut 10 and the boss 15¹ on the inside lever 5¹. The cylinder 80 is closed at its lower end by a cylinder head 82 and is arranged to be at times supplied with fluid pressure through a pipe 83 which is screwed into a suitable opening provided in the cylinder head 82. Mounted in the cylinder 80 is a reciprocable piston 84 which is biased to a retracted position in which it is shown in the drawings by means of a compressed coil spring 85. The piston 84 drives a piston rod 86, the upper end of which is formed with an integral bifurcated cam 87 which is disposed for vertical sliding movement between the combined support and cam guide 81 and the gauge adjusting nut 10. The bifurcations of the cam 87 are provided on the side adjacent the nut 10 with horizontally aligned low portions 87ª and with horizontally aligned high portions 87ᵇ so disposed that the bulges 10ª of the gauge adjusting nut 10 will engage the bifurcations at the low or the high portions according as the piston 84 occupies its retracted or its projected position. The parts are so proportioned and so adjusted that when the bulges 10ª are engaging the bifurcations at the low portions 87ª as shown in the drawings, both braking bars will occupy their inactive positions in which they will be clear of the wheels of a car passing through the retarder, but that, when the bulges 10ª are engaging the bifurcations at the high portions 87ᵇ, the braking bars will then be moved to their normal positions in which they will frictionally engage the opposite side faces of each wheel of a car passing through the retarder in the same manner as was previously described in connection with Fig. 9. The cam 87 is adapted to be moved from the position in which the bulges 10ª of the nut 10 engage the bifurcations at the low portion 87ª to the position in which the portions 10ª engage the bifurcations at the high portion 87ᵇ by admitting fluid pressure to the cylinder 80 through the pipe 83, and the cylinder 80 is of such size that sufficient force to do this can only be obtained when there is no car in the retarder. The high portions 87ᵇ of the bifurcations are so shaped that any forces which are transmitted to the piston 84 through the gauge adjusting nut 10 and the cam 87 at the high portions while a car is passing through the retarder will be insufficient to force the piston to its retracted position if the cylinder 80 is then supplied with fluid pressure, but that, when fluid is exhausted from the cylinder 80 and a car is passing through the retarder, the forces which are then transmitted to the piston through the gauge adjusting nut and the cam combined with the biasing force of the spring 85 will be sufficient to drive the cam and piston downwardly, and thus allow the retarder to open. The parts are still further so proportioned that when there is no car in the retarder and air is exhausted from the cylinder 80, spring 85 will exert sufficient force on the piston 84 to return it to its retracted position. The nut 10 is rendered self-locking while it is engaging the bifurcations at the low portions 87ª by engagement of the upper surfaces of the bulges 10ª with outwardly sloping surfaces 87ᶜ which are formed on the bifurcations above the low portions, and while it is engaging the bifurcations at the high portions 87ᵇ by engagement of the lower surfaces of the bulges 10ª with outwardly sloping surfaces 87ᵈ which are provided on the bifurcations below the high portions. The cylinder 80 and cam 87 is maintained in the desired vertical position by the force of gravity and by providing the combined support and cam guide 81 with horizontally aligned bulges 81ª which fit into the recesses 16¹ in the boss 15¹ of the lever 5¹.

It will be readily understood that in actual practice the retarder will comprise a plurality of units U similar to the unit shown in Fig. 19 disposed at intervals along the retarder, and the air to operate the cylinders to these units can be controlled either manually at the retarder, or remotely by electropneumatically controlled means in a well-known manner. Only one air pressure is required, and it follows, therefore, that only one degree of retardation can be obtained automatically for a given length of retardation. It should be pointed out, however, that the one degree of retardation that can be obtained can be adjusted manually as conditions require by either adjusting the spacing between the braking bars A¹ and A² when they occupy their normal positions, or by adjusting the initial compression of the retarder springs 12.

Figure 21:
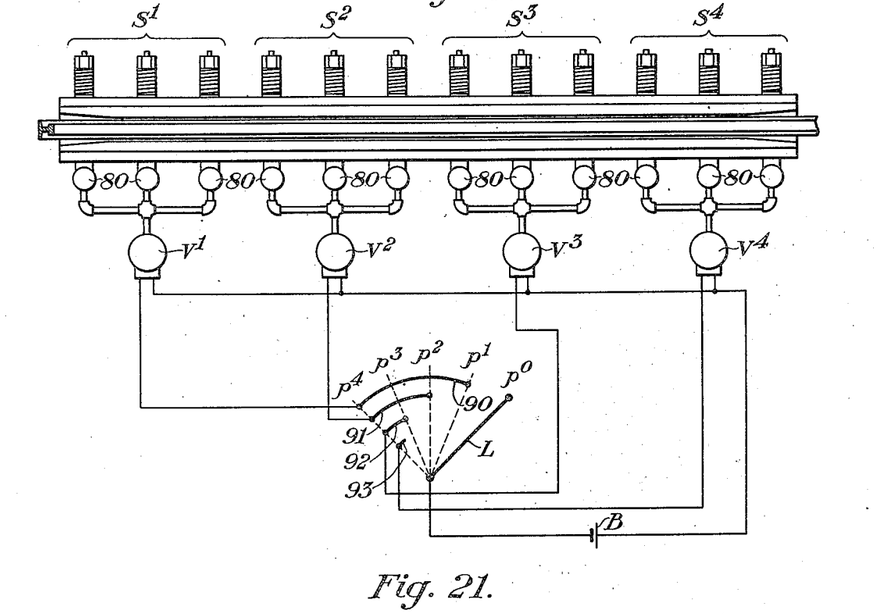
Fig. 21 is a diagrammatic view showing a means for controlling a car retarder of the type which is shown in Fig. 19.

It is possible to arrange a retarder of the type just described in sections in such manner that different lengths of the retarder may be rendered effective to retard a car passing through the retarder, thus making it possible to automatically obtain different degrees of retardation from the retarder, and in Fig. 21, I have shown a retarder arranged in this manner. As illustrated in Fig. 21, the retarder is divided into four sections S¹, S², S³, and S⁴, each comprising a group of three spring units. Associated with each section is an electropneumatic valve designated by the reference character V with a distinguishing exponent, which valve controls the supply of fluid pressure to the cylinders 80 of all three units of the associated section in such manner that these units will be connected with a suitable source of fluid pressure, or with atmosphere, through the medium of suitable piping according as the associated valve V is energized or deenergized. The valves V are of well-known construction, and since the construction of these valves is immaterial to my present invention, it is believed to be unnecessary to describe their construction herein. The valves V are selectively controlled by means of a manually operable lever L capable of assuming an off position $p^0$ and a plurality of on positions $p^1$, $p^2$, $p^3$, and $p^4$, respectively. When the lever occupies its $p^0$ position, the valves V are all deenergized and the entire retarder is then inactive. When, however, the lever L is moved to its $p^1$ position, it closes a contact 90 and, under these conditions, valve V¹ is supplied with current from a suitable source, here shown as a battery B, over a circuit which is obvious from the drawings, thus causing the cylinders 80 of the units of section S¹ to be supplied with fluid pressure, and hence rendering this section effective to retard a car passing through the apparatus. When the lever L is moved to its $p^2$ position, the contact 90 remains closed and another contact 91 becomes closed, and, as a result, the valves V¹ and V² are then both energized over circuits which are obvious from an inspection of the drawings. The cylinders 80 of the units of sections S¹ and S² are then all supplied with fluid pressure, so that the sections $S^1$ and $S^2$ are both rendered effective to retard a car passing through the retarder. When the lever L is moved to its $p^3$ position, the contacts 90 and 91 both remain closed and another contact 92 becomes closed, thus causing the valves $V^1$, $V^2$, and $V^3$ to become energized, and hence rendering the sections $S^1$, $S^2$, and $S^3$ effective to retard cars. When the lever L is moved to its $p^4$ position, the contacts 90, 91, and 92 are then all closed and a contact 93 is also closed, with the result that all four valves are energized so that the entire retarder is then effective for retarding cars.

It should be pointed out that with the retarder constructed in the manner shown in Figs. 20 and 21, a relatively small amount of fluid is required to move the braking bars to their normal positions, and the retarder is therefore economical to operate. It should also be pointed out that while, with the retarder constructed as shown in Figs. 20 and 21, the fluid pressure cylinders 89 are not large enough to actually move the braking bars to their closed or normal positions at a unit which is directly opposite a car wheel, the braking bars are sufficiently flexible so that they can be moved to their braking positions at the unit next in advance. The spring units are spaced fairly close together, and it follows, therefore, that the ability to close the retarder up against a car wheel is not a great disadvantage since the full retarding effect will be available as soon as the car has moved a relatively short distance.

Although I have herein shown and described only a few forms of apparatus embodying my invention, it is understood that various changes and modifications may be made therein within the scope of the appended claims without departing from the spirit and scope of my invention.

Having thus described my invention, what I claim is:

1. Railway braking apparatus comprising a lever provided at its lower end with a recess which receives one flange of a track rail in such manner that the lever is free to rotate about said one flange as a fulcrum, a brake shoe secured to the upper end of said lever, and means for biasing said lever to a position in which said brake shoe will frictionally engage the wheels of a car traversing said track rail.

2. Railway braking apparatus comprising a lever fulcrumed at its lower end on the base flange of a railway track rail and provided intermediate its ends with an opening which aligns with an opening in the web of the track rail, means adapted for frictional engagement with the wheels of a car traversing said rail secured to the upper end of said lever, a spring bolt extending through the opening in said rail and the opening in said lever, and a spring mounted on said spring bolt in such manner that said lever is biased by said spring to a position in which said wheel engaging means will frictionally engage the wheels of cars traversing said track rail.

3. Railway braking apparatus comprising a lever disposed adjacent one side of a track rail and provided at its lower end with a recess which receives a member about which the lever fulcrums, a brake shoe secured to the upper end of said lever, and biasing means secured to the rail and cooperating with said lever for biasing said brake shoe to a braking position and for holding the lever in the proper position to fulcrum about said member.

4. Railway braking apparatus comprising a plurality of spring units disposed at intervals along a track rail, each said spring unit comprising a lever provided at its lower end with a recess which receives the one base flange of the rail in such manner that the lever is free to rotate about the base flange as a fulcrum and a spring which biases the lever toward the rail, and wheel engaging means secured to the upper ends of all of said levers.

5. Railway braking apparatus comprising two levers fulcrumed at their lower ends on the base flanges of a railway track rail on opposite sides of the rail and biased toward each other by biasing means which holds the levers in place on the rail, and brake shoes secured to the upper ends of the levers and adapted to frictionally engage the opposite side faces of the wheels of a car traversing said rail for retarding the speed of the car.

6. Railway braking apparatus comprising two levers disposed on opposite sides of a track rail and provided at their lower ends with recesses which receive the base flanges of the rail as a fulcrum in such manner that the levers are free to rotate toward and away from each other, brake shoes secured to the upper ends of said levers, and spring means interconnecting said levers in such manner that said levers are biased by said spring means to positions in which said brake shoes will frictionally engage the opposite side faces of a car wheel traversing said rail.

7. Railway braking apparatus comprising two levers pivotally supported at their lower ends on the base flanges of a railway track rail on opposite sides of the rail for swinging movement toward and away from the rail, wheel engaging means secured to the upper ends of said levers, spring means for biasing said levers toward each other, and means for limiting the movement of said levers toward each other.

8. Railway braking apparatus comprising two levers pivotally supported at their lower ends on the base flanges of a railway track rail on opposite sides of the rail for swinging movement toward and away from the rail, wheel engaging means secured to the upper ends of said levers, spring means for biasing said levers toward each other, and separate and independent means for limiting the movement of said two levers toward each other to predetermined positions.

9. Railway braking apparatus comprising two levers pivotally supported at their lower ends on the base flanges of a railway track rail on opposite sides of the rail for swinging movement toward and away from the rail, wheel engaging means secured to the upper ends of said levers, spring means for biasing said levers toward each other, and adjustable means for separately limiting the movement of said two levers toward each other to predetermined positions.

10. Railway braking apparatus comprising two levers pivotally supported at their lower ends on opposite sides of a railway track rail for swinging movement toward and away from the rail, wheel engaging means secured to the upper ends of said levers, adjustable spring means for biasing said levers toward each other, and adjustable means for limiting the positions to which said levers are free to move due to said biasing means.

11. Railway braking apparatus comprising two levers pivotally supported at their lower ends on the base flanges of a railway track rail on opposite sides of the rail for swinging movement toward and away from the rail and each provided with an opening which aligns with the opening in the other lever and an opening in the web of the rail, a spring bolt passing through said openings and provided at each end with a nut, a spring mounted on said bolt between one lever and the adjacent nut and effective for biasing the levers toward the track rail, and brake shoes secured to the upper ends of said levers.

12. Railway braking apparatus comprising two levers pivotally supported at their lower ends on the base flanges of a railway track rail on opposite sides of the rail for swinging movement toward and away from the rail and each provided with an opening which aligns with the opening in the other lever and an opening in the web of the rail, a spring bolt passing through said openings and provided at each end with a nut, a spring mounted on said bolt between one lever and the adjacent nut and effective for biasing the levers toward the track rail, means for limiting the movement of each lever toward the track rail, and brake shoes secured to the upper ends of said levers.

13. Railway braking apparatus comprising two levers pivotally supported at their lower ends on the base flanges of a railway track rail on opposite sides of the rail for swinging movement toward and away from the rail and each provided with an opening which aligns with the opening in the other lever and an opening in the web of the rail, a spring bolt passing through said openings and provided at each end with a nut, a spring mounted on said bolt between one lever and the adjacent nut and effective for biasing the levers toward the track rail, a brake shoe secured to the upper end of one lever by means of a bolt the inner end of which cooperates with the rail head to limit the movement of said one lever toward the rail, a brake shoe secured to the upper end of the other lever, and other means for limiting the movement of said other lever toward the rail.

14. Railway braking apparatus comprising two levers pivotally supported on a track rail on opposite sides of the rail in such manner that their upper ends are free to swing toward and away from the rail, each said lever being provided with an opening which aligns with an opening in the rail web, a spring bolt extending through all of said openings and provided intermediate the rail web and the one lever with a shoulder which is larger than the opening in the rail web, a nut adjustably screwed onto one end of said bolt adjacent the outer end of the opening in said lever, a first compressed spring mounted on the other end of said bolt and acting to bias both levers toward the track rail, a second compressed spring disposed between said shoulder and said one lever and effective for holding said one lever in the relative position with respect to said bolt in which it engages said nut and for biasing said spring bolt to the position in which said shoulder engages the rail web, and brake shoes screwed to the upper ends of said levers.

15. Railway braking apparatus comprising two levers disposed on opposite sides of a railway track rail and each provided at its lower end with a recess which receives the base flange of the rail in such manner that the levers are free to pivot about the base flanges as a fulcrum, each said lever being provided intermediate its ends with an opening which aligns with the opening in the other lever and with an opening which is provided in the web of the track rail, a spring bolt extending with clearance through all of said openings and provided between the rail and one lever with a shoulder which is larger than the opening in the rail web, a first nut screwed onto one end of said spring bolt and cooperating at its inner end with said one lever, a second nut disposed on the other end of said spring bolt, a first compressed coil spring disposed on said other end of said spring bolt between a first spring seat which abuts against said other lever and a second spring seat which abuts against said second nut, said first spring being effective to bias said two levers toward each other, a second compressed coil spring disposed on said spring bolt between said shoulder and said first lever and effective for biasing the spring bolt assembly to the position in which said shoulder engages the rail web and said first lever engages said first nut, and wheel engaging means secured to the upper ends of said levers.

16. Railway braking apparatus comprising two levers disposed on opposite sides of a railway track rail and each provided at its lower end with a recess which receives the base flange of the rail in such manner that the levers are free to pivot about the base flange as a fulcrum, each said lever being provided intermediate its ends with an opening which aligns with the opening in the other lever and with an opening which is provided in the web of the track rail, a spring bolt extending with clearance through all of said openings and provided between the rail and one lever with a shoulder which is larger than the opening in the rail web, a first nut screwed onto one end of said spring bolt and cooperating at its inner end with said one lever, a second nut disposed on the other end of said spring bolt, a first compressed coil spring disposed on said other end of said spring bolt between a first spring seat which abuts against said other lever and a second spring seat which abuts against said second nut, said first spring being effective for biasing said two levers toward each other, a brake shoe secured to the upper end of said other lever by means of a stud bolt which cooperates at its inner end with the rail head to position said other lever with respect to the rail, a brake shoe secured to the upper end of the one lever, and a second compressed coil spring disposed on said spring bolt between said shoulder and said one lever and effective for biasing the spring bolt assembly to the position in which said shoulder engages the rail web and said one lever engages said first nut, said first nut being so adjusted that when said shoulder is engaging the rail web said second shoe will occupy a predetermined position relative to the rail, and said stud bolt being so adjusted that when said shoulder is engaging the rail web and said bolt is engaging the rail head said first shoe will occupy a predetermined position relative to said rail.

17. Railway braking apparatus comprising two levers disposed on opposite sides of a railway track rail and each provided at its lower end with a recess which receives the base flange of the rail in such manner that the levers are free to pivot about the base flange as a fulcrum, each said lever being provided intermediate its ends with an opening which aligns with the opening in the other lever and with an opening which is provided in the web of the track rail, a spring bolt extending with clearance through all of said openings and provided between the rail and one lever with a shoulder which is larger than the opening in the rail web, a first nut screwed onto one end of said spring bolt and cooperating at its inner end with said one lever, a second nut disposed on the other end of said spring bolt, a first compressed coil spring disposed on said other end of said spring bolt between a first spring seat which abuts against said other lever and a second spring seat which abuts against said second nut, said first spring being effective for biasing said two levers toward each other, a second compressed coil spring disposed on said spring bolt between said shoulder and said one lever and effective for biasing the spring bolt assembly to the position in which said shoulder engages the rail web and said one lever engages said first nut, and wheel engaging means secured to the upper ends of said levers, said first nut being provided at its inner end with aligned arcuate bulges which cooperate with aligned arcuate recesses formed in said one lever to facilitate rotation of said one lever relative to said nut and to prevent rotation of said nut about the axis of said bolt, and said first spring seat being provided at the end which abuts against said other lever with aligned arcuate bulges which cooperate with aligned arcuate recesses in said second other lever to facilitate rotation of said other lever relative to said one spring seat and to prevent rotation of said seat about the axis of said bolt.

18. Railway braking apparatus comprising two levers disposed on opposite sides of a track rail and pivotally supported at their lower ends on the base flanges of the rail for swinging movement toward and away from the rail, brake shoes secured to the upper ends of said levers, and means for biasing said levers to such positions that the one brake shoe normally projects into the path of a car wheel traversing said rail and the other brake shoe is normally disposed out of the path of a car wheel traversing said rail but that when a car wheel moves into engagement with said one brake shoe said spring means will act to move said levers to such positions that both brake shoes will then frictionally engage the car wheel.

19. Railway braking apparatus comprising two levers pivotally supported at their lower ends on the base flanges of a railway track rail on opposite sides of the rail for swinging movement toward and away from the rail and each provided with an opening which aligns with the opening in the other lever and an opening in the web of the rail, a spring bolt passing through said openings and provided at each end with a nut, a spring mounted on said bolt between one lever and the adjacent nut and effective for biasing the levers toward the track rail, brake shoes secured to the upper ends of said levers, means associated with said spring for adjusting the initial compression of the spring, and means for positioning the brake shoes relative to the rail when no car wheel is engaging the brake shoes.

20. Railway braking apparatus comprising two levers pivotally supported at their lower ends on the base flanges of a railway track rail on opposite sides of the rail for swinging movement toward and away from the rail and each provided with an opening which aligns with the opening in the other lever and an opening in the web of the rail, a spring bolt passing through said openings and provided at each end with a nut, two spring guides slidably mounted on said bolt between one lever and the adjacent nut, a compressed spring surrounding said bolt between said two guides and effective for biasing the levers toward each other, means for varying the positions to which said spring guides are free to move in response to the bias of said spring to vary the compression of the spring, and brake shoes secured to the upper ends of said levers.

21. Railway braking apparatus comprising two levers disposed on opposite sides of a track rail and pivotally supported at their lower ends on the base flanges of the rail for swinging movement toward and away from the rail, each said lever being provided with an opening which aligns with the opening in the other lever and with an opening in the web of the track rail, a spring bolt extending with clearance through all three of said openings and provided with a shoulder which is disposed between the rail and the one lever, a first gauge adjusting nut adjustably screwed onto said spring bolt adjacent the outer side of said one lever, an inner spring seat disposed on said spring bolt adjacent the outer side of said other lever and provided with a sleeve portion which projects away from said lever, a second spring seat slidably mounted on the sleeve portion of said first seat, a compressed coil spring surrounding said sleeve portion between said two spring seats, a nut screwed onto said sleeve portion adjacent the outer side of said second spring seat for adjusting the compression of said spring, said second spring seat being provided with an extension which projects past said spring adjusting nut in such manner that said spring adjusting nut is free to slide within said extension but is constrained to rotate in response to rotation of said second spring seat, a washer abutting against the extension of said second spring seat and keyed to said shaft by means of a feather key, a second gauge adjusting nut screwed onto said bolt adjacent said washer and abutting against the outer face of said washer, said washer and said nut and said outer spring seat being provided with means to prevent their relative rotation, a second compressed coil spring disposed between said rail and said other lever, a depending lug formed on each of said two levers, a third spring stretched between said lugs, and brake shoes secured to the upper ends of said levers.

22. Railway braking apparatus comprising two levers disposed on opposite sides of a track rail and pivotally supported at their lower ends on the base flanges of the rail for swinging movement toward and away from the rail, each said lever being provided with an opening which aligns with the opening in the other lever and with an opening in the web of the track rail, a spring bolt extending with clearance through all three of said openings and provided with a shoulder which is disposed between the rail and the one lever, a first gauge adjusting nut adjustably screwed onto said spring bolt adjacent the outer side of said one lever, an inner spring seat disposed on said spring bolt adjacent the outer side of said other lever and provided with a sleeve portion which projects away from said lever, a second spring seat slidably mounted on the sleeve portion of said first seat, a compressed coil spring surrounding said sleeve portion between said two spring seats, a nut screwed onto said sleeve portion adjacent the outer side of said second spring seat for adjusting the compression of said spring, said second spring seat being provided with an extension which projects past said spring adjusting nut in such manner that said spring adjusting nut is free to slide within said extension but is constrained to rotate in response to rotation of said second spring seat, a washer abutting against the extension of said second spring seat and keyed to said shaft by means of a feather key, a second gauge adjusting nut screwed onto said bolt adjacent said washer and abutting against the outer face of said washer, said washer and said nut and said outer spring seat being provided with means to prevent their relative rotation, a second compressed coil spring disposed between said rail and said other lever, a depending lug formed on each of said two levers, a third spring stretched between said lugs, and brake shoes secured to the upper ends of said levers, said gauge adjusting nuts being so adjusted that when no car is engaging said brake shoes the shoe carried by said one lever will project into the path which car wheels traversing said rail take and the shoe carried by the other lever will be located outside of the path which car wheels traversing said rail take but that the distance between said two shoes will be less than the width of the car wheels.

23. Railway braking apparatus comprising two levers disposed on opposite sides of a track rail and pivotally supported at their lower ends on the base flanges of the rail for swinging movement toward and away from the rail, each said lever being provided with an opening which aligns with the opening in the other lever and with an opening in the web of the track rail, a spring bolt extending with clearance through all three of said openings and provided with a shoulder which is disposed between the rail and said one lever, a first gauge adjusting nut screwed onto one end of said spring bolt, a second gauge adjusting nut screwed onto the other end of said spring bolt, two spring seats slidably mounted on said bolt between the one lever and said first nut, a first spring disposed between said spring seats and acting to bias said levers toward each other, apertured lugs formed on both spring seats, bolts extending with clearance through the apertures in said lugs for adjusting the initial compression of said first spring, a second spring disposed on said spring bolt between the rail and said other lever and effective to bias the spring assembly to a position in which the shoulder on said spring bolt engages the rail web, a depending lug on the lower end of each lever, a spring stretched between said lugs for maintaining the other lever in the position in which it engages the second gauge adjusting nut, and brake shoes secured to the upper ends of said two levers.

24. Railway braking apparatus comprising two levers disposed on opposite sides of a track rail and pivotally supported at their lower ends on the base flanges of the rail for swinging movement toward and away from the rail, each said lever being provided with an opening which aligns with the opening in the other lever and with an opening in the web of the track rail, a spring bolt extending with clearance through all three of said openings and provided with a shoulder which is disposed between the rail and said one lever, a first gauge adjusting nut screwed onto one end of said spring bolt, a second gauge adjusting nut screwed onto the other end of said spring bolt, two spring seats slidably mounted on said bolt between the one lever and said first nut, a first spring disposed between said spring seats and acting to bias said levers toward each other, means for limiting the relative positions to which said spring sleeves are free to move due to the bias of said spring to adjust the initial compression of said spring, a second spring disposed on said spring bolt between the rail and said other lever and effective to bias the spring assembly to a position in which the shoulder on said spring bolt engages the rail web, a depending lug on the lower end of each lever, a spring stretched between said lugs for maintaining the other lever in the position in which it engages the second gauge adjusting nut, and brake shoes secured to the upper ends of said two levers.

25. Railway braking apparatus comprising two levers disposed on opposite sides of a track rail and pivotally supported for swinging movement toward and away from the rail, brake shoes secured to the upper ends of said levers, and means for biasing said levers to such positions that the one brake shoe normally projects into the path of a car wheel traversing said rail and the other shoe is normally disposed out of the path of a car wheel traversing said rail but that when a car wheel moves into engagement with said one brake shoe said biasing means will act to move said levers to such positions that both shoes will then frictionally engage the car wheel.

HERBERT L. BONE.